United States Patent [19]

Merl

[11] Patent Number: 5,472,103

[45] Date of Patent: Dec. 5, 1995

[54] SEGMENTED SHELVING CONSTRUCTION

[76] Inventor: Milton J. Merl, 50 Wilcox Rd., Stonington, Conn. 06830

[21] Appl. No.: 248,759

[22] Filed: May 25, 1994

[51] Int. Cl.⁶ .................................................. A47B 43/00
[52] U.S. Cl. .............................. 211/187; 211/90; 211/94; 211/190; 403/256
[58] Field of Search ...................................... 211/187, 133, 211/94.5, 90, 190, 204, 206, 94, 86, 87, 103; 403/256, 257, 261, 298, 375

[56] References Cited

U.S. PATENT DOCUMENTS

| 879,341 | 2/1908 | Welch | 211/94 |
|---|---|---|---|
| 2,031,718 | 2/1936 | Kress | 211/87 |
| 2,546,720 | 3/1951 | Brothers | 211/87 |
| 3,101,681 | 8/1963 | Streater | 211/187 X |
| 3,733,755 | 5/1973 | Butler | 211/187 X |
| 3,993,002 | 11/1976 | Stroh | 211/153 X |
| 4,108,085 | 8/1978 | Shepherd et al. | 108/108 |
| 4,138,019 | 2/1979 | Smith | 211/190 X |
| 5,097,968 | 3/1992 | Gregory | 211/94.5 X |
| 5,305,898 | 4/1994 | Merl | 211/87 |

Primary Examiner—Ramon O. Ramirez
Assistant Examiner—Korie H. Chan
Attorney, Agent, or Firm—Schweitzer Cornman & Gross

[57] ABSTRACT

A segmented shelving construction in which the vertical shelving cubic volumes are custom designed in accordance with the actual product being sold. The shelving is attached to a standard upright gondola construction consisting of a base and at least two vertical uprights per gondola. The uprights have a plurality of vertical slots to be engaged by hooks supporting the shelving. In the present invention, horizontal hanging bars with adjustable end male plugs carrying hooks to be received within the vertical upright slots are positioned at a desired height. The hanging bars then receive at least two vertical shelving standards, the shelving standards contain elongated slots near the top and bottom edges of the standards, or at any other desired location. The hanging bars are received in the vertical slots and there is sufficient room for them to be moved within the slots. Typical shelves of any desired size are supported by typical brackets having hooks to be received in a plurality of vertical slots within the vertical standards. Because of the vertical slots, variations in the vertical slots and the uprights or uneven inferior construction can easily be accommodated because of the elongated slots in the vertical standards.

6 Claims, 11 Drawing Sheets

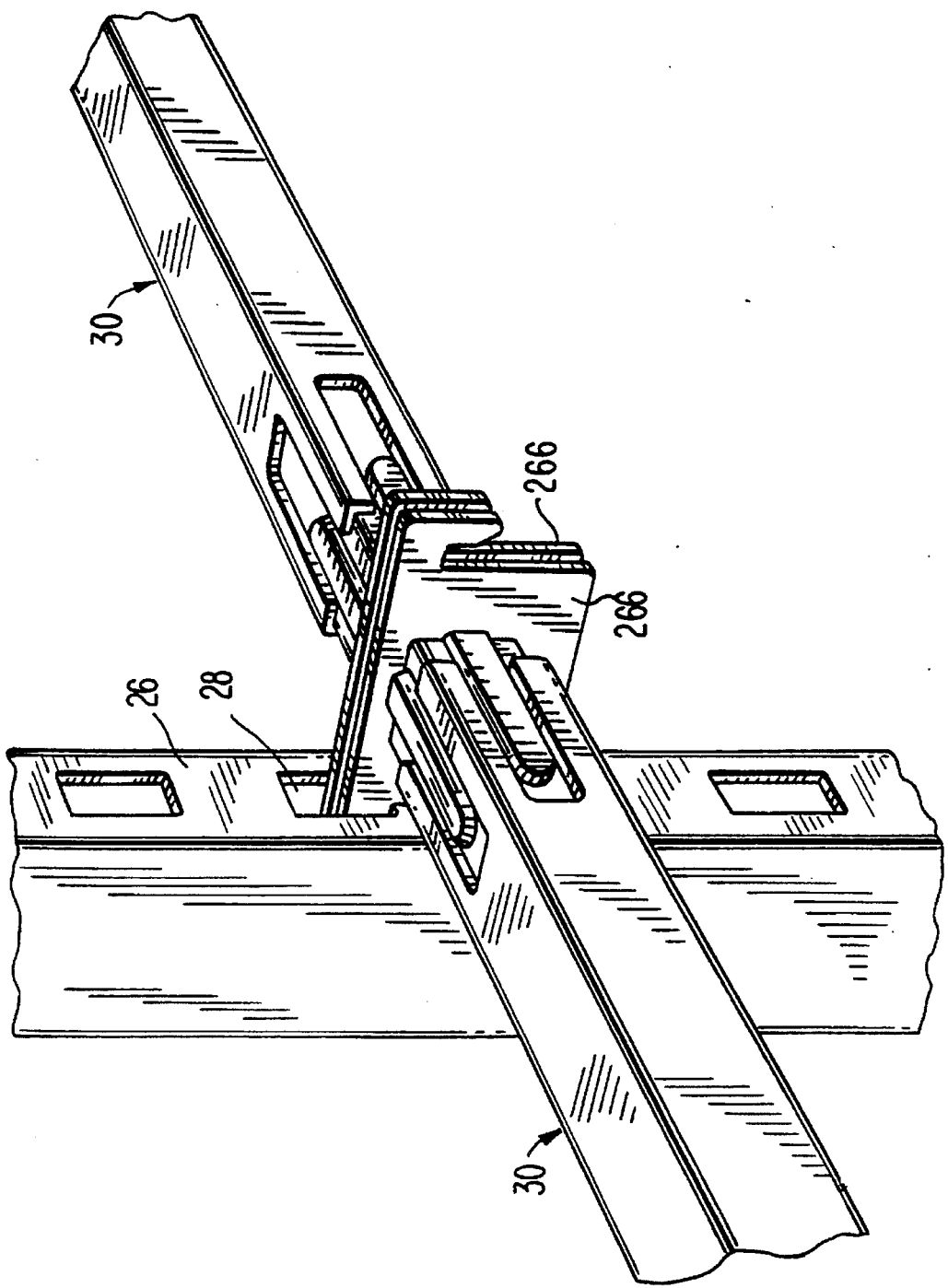

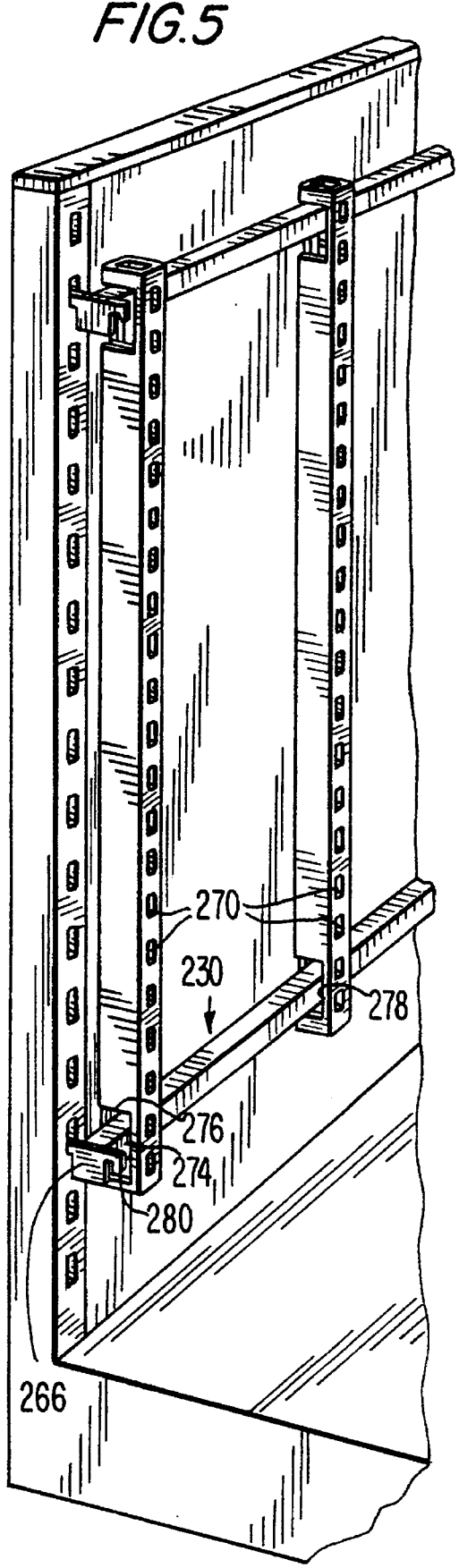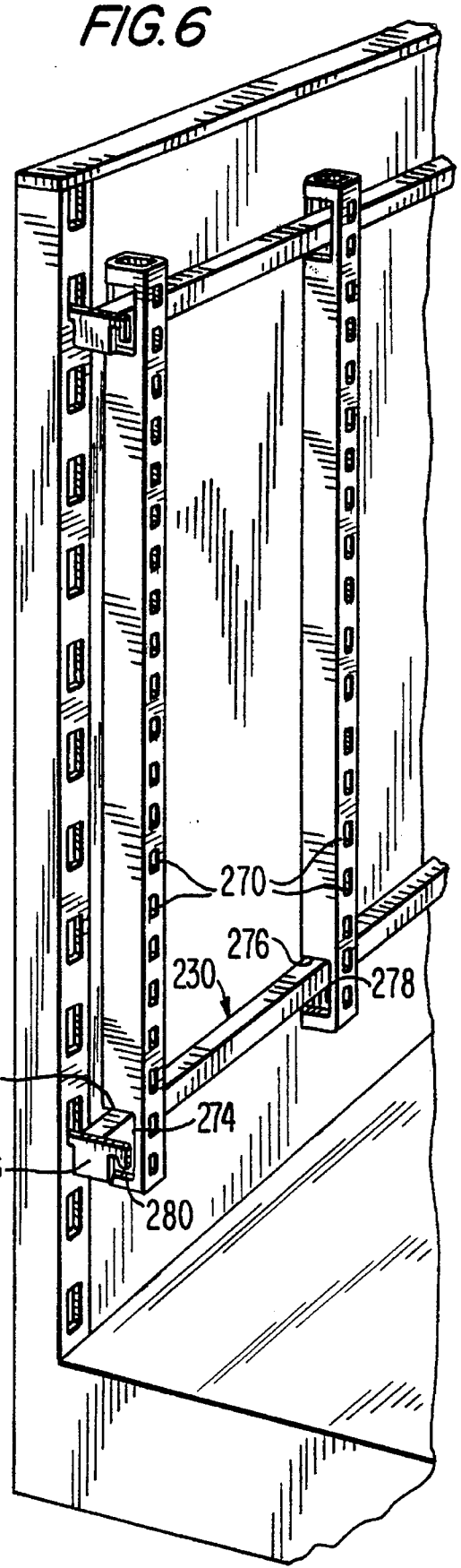

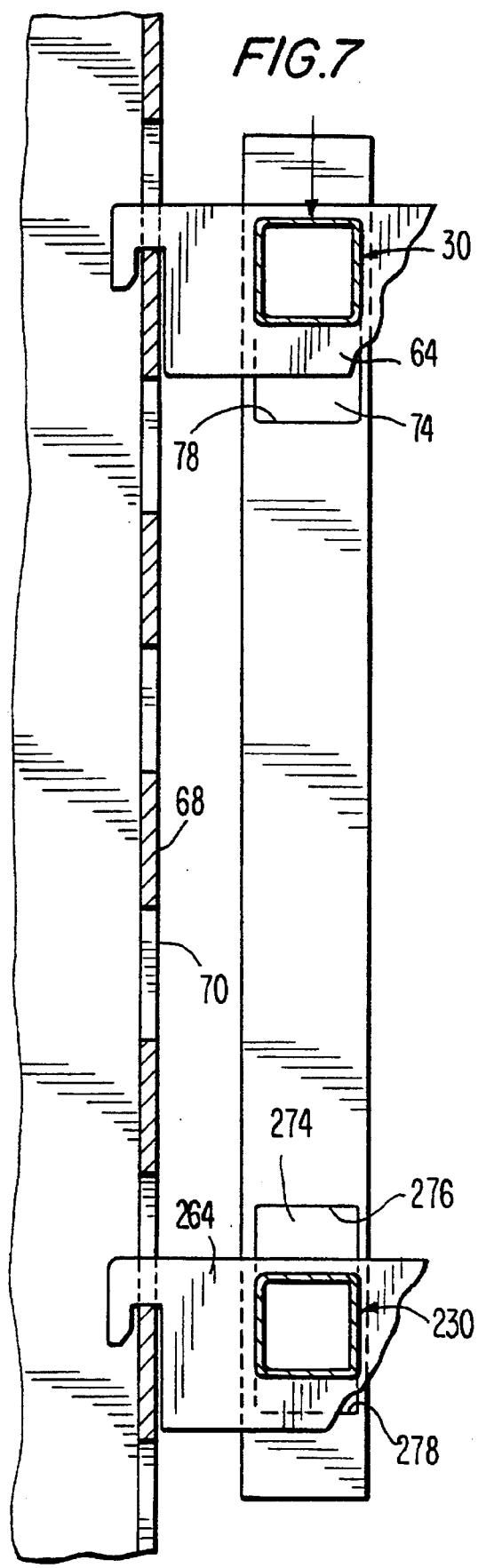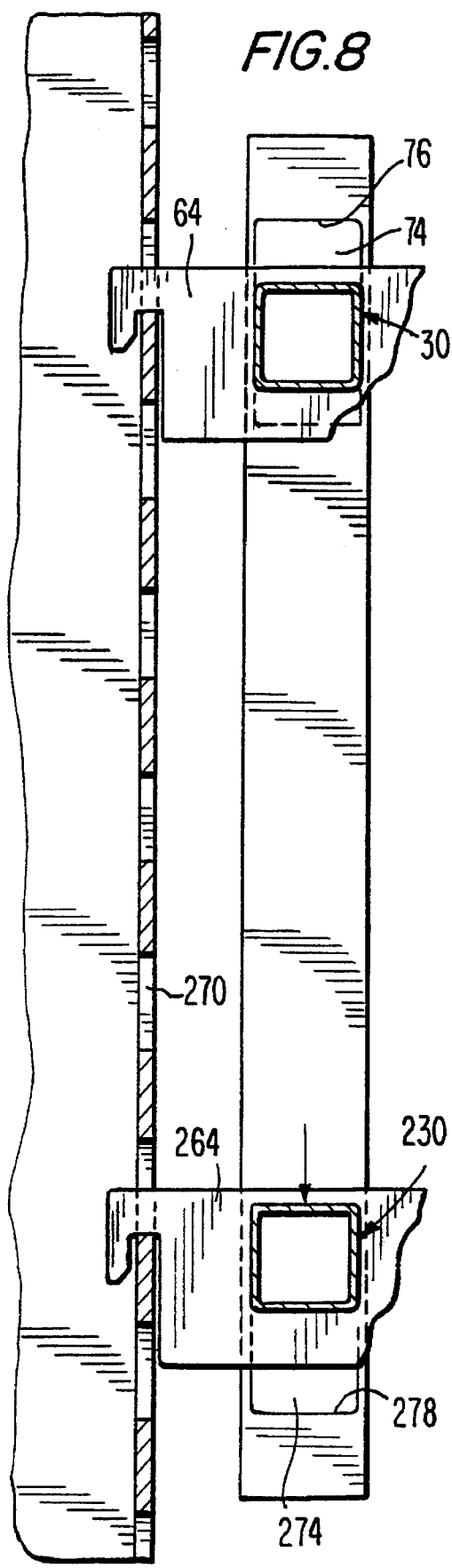

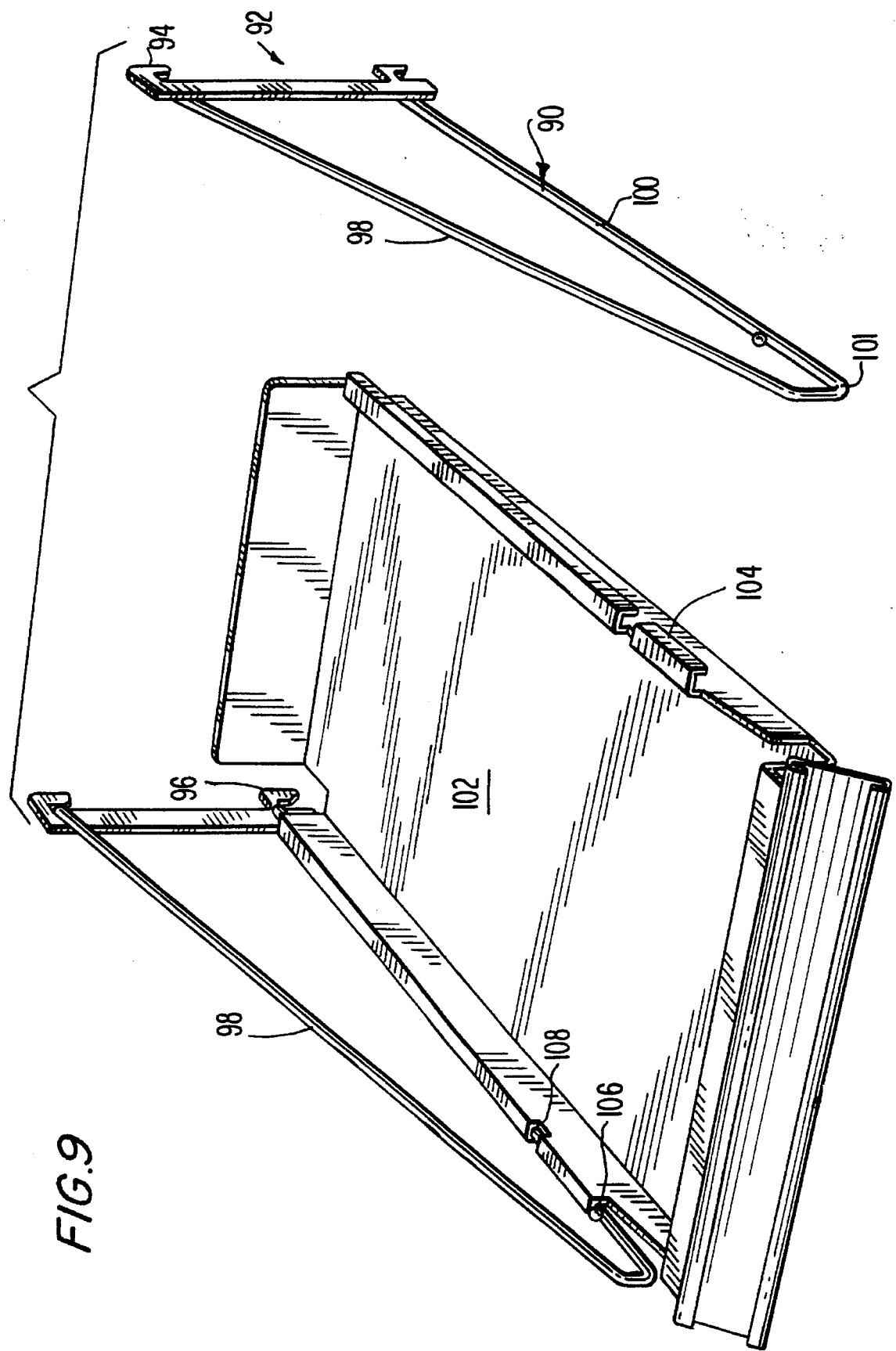

SEGMENTED SHELVING CONSTRUCTION

This invention relates to gondola merchandising and more particularly to an improved segmented shelving construction for use in currently available gondolas.

BACKGROUND AND SUMMARY OF THE INVENTION

The majority of inventory in today's stores are carried in gondola constructions. Gondola merchandising has changed little over the years. Generally there is a floor platform with a vertical upright pegboard. On the borders of the gondolas there are vertical weight-supporting uprights having a plurality of vertically aligned slots. The uprights via the vertical slots carry shelving and other inserts in or on which merchandise is placed. The pegboard carries some weight but it is minor in comparison to that carried by the uprights.

There is a constant demand on behalf of the self-service food and non-food packaged goods industry for retailers to increase their efficiency. Added to this are the ever-expanding lines of products designed to attract more consumers, and which constantly fight for greater shelf space. This has all resulted in a greater segmentation of sales per individual retail unit of product, or SKU.

Since some products sell better than others, there is a tendency to under-inventory fast moving products, which results in costly, shorter reorder cycles to maintain proper inventory. There is not enough gondola space available to keep top inventory items in open stock. The space has to be frequently serviced. At the same time slower moving items tend to stay on the shelves longer and occupy more space considering their contribution to revenues. All this activity has resulted in an extremely inefficient environment, both from labor, warehousing, and inventory management perspectives. A good example of a category that suffers from these problems is the pet food category, particularly dry bags of dog and cat food, as well as cat litter bags. The bags not only require a large cubic space, but these are bulky, making them awkward to display.

The current gondola merchandising system is outdated in its ability to inventory or display products in volume that match their turns. Accordingly, key sellers in the category tend to be depleted while slow sellers tend to be overinventoried. The current "solution" necessitates frequent ordering and stocking of fast moving stock keeping units and over-inventorying of slow ones— a very costly solution. A 200% increase in financing is required to carry double the amount of inventory.

As a result there is need to replan or replanogram gondola shelves. This should result in creating uniform volumes or stacking heights per SKU thereby controlling uniform inventory per SKU regardless of the product movement. While it is possible to compensate for key sellers by providing more selling volume (multiple facings), in reality, most stores are not large enough to accept a vast number of multiple facings of fast movers to, in effect, balance out the whole product category. The ideal solution, therefore, would be to balance the height of the inventory stack, fostering more uniform stocking. This in turn suggests using smaller shelves. At the extreme, literally, one shelf per SKU is possible.

Most gondolas are made in a standard 48" width. For the proposed system to be successful, shelving must be effectively supported by the gondolas without considering the 48" limitations. In other words, regardless of the gondola width, the shelves have to be segmented down to the individual width of the product so that, in fact, each cluster of product in inventory can be planogrammed to the exact physical size and product needed to meet the sales demand. Therefore, a shelf may be less than, equal to, or more than 48"

Objects and Advantages of the Present Invention

An object of the present invention is to develop an improved segmented shelving construction to accommodate the exact physical size and product volume of specific products.

Another object of the present invention is to provide a system in which segmented shelving constructions of different, desired, non-standard dimensions can be placed within the standard dimensions of an existing gondola and can be adjusted in height to create individual merchandising cubes.

Yet a further object of the present invention is to provide a system of segmented shelving capable of addressing any product width.

Still yet another object of the present invention is to provide shelves whose east to west width is infinitely adjustable.

An advantage of the present invention is to provide shelves of fixed area which may abut the gondola wall or be spaced from it.

Another advantage of the present invention is to provide shelves which may be adjustable from back to front.

Still yet another object of the present invention is to provide shelving with adjustability forward and away from the upright gondola wall, either in a fixed dimension or in a telescoping construction.

Still yet another object of the present invention is to provide a segmented shelving construction in which upper and lower hanging bars support vertical shelving standards in any desired east-west configuration to accommodate shelves of different widths.

Still yet a further object of the present invention is to provide vertical shelving standards having a plurality of vertical slots so that shelving may be placed any north-south desired location.

Still yet a further object of the present invention is provide hanging bars and shelving standards which are designed to accommodate for uneven or different pitch in the gondola upright slot dimensions.

Yet another object of the present invention is to provide a segmented shelving construction in which hanging bars and vertical shelving standards may be stacked one upon the other when the gondola uprights are of sufficient height to accept more than one construction.

A feature of the construction is the ability of the standards to center on the seams of traditional gondolas, thereby maintaining total flexibility along multiple lengths of fixturing.

A feature of the present invention is to provide shelving in which the triangular support brackets movably snap into engagement with the shelf and can fold for easy shipment and storage.

Yet a further objective of the present invention is to provide flat shelves of transitional design supported by bottom brackets, allowing the creation of large horizontal surfaces with no vertical interruptions.

Still yet another object of the present invention is to provide a device that provides a minimum number of components for ease of installation and cost effective purchasing and warehousing.

Still yet another object of the present invention is to provide a segmented shelving construction which will enable easy stacking and maintenance in a neat fashion, thereby lowering store labor costs.

Still yet another object of the present invention to provide an improved merchandising system which will be simple and easy to fabricate and yet be economical to a high degree in use.

BRIEF DESCRIPTION OF THE PRESENT INVENTION

The invention consists of a plurality of vertical shelving standards which are custom designed to interface and slide along the east-west direction on hanging bars which hook into existing gondolas through an interface with the same slots that support existing shelving.

The hanging bars have end plugs with hooks designed to be secured within gondola vertical upright slots. The vertical shelving standards have elongated slotted openings at their upper and lower ends through which upper and lower hanging bars pass. The standards can then be moved horizontally in the east-west direction along the hanging bars. The elongated slotted openings allow accommodation for either an uneven or a different pitch of the gondola vertical slots.

The vertical standards marry to a series of triangular-in-design vertical or horizontal wire brackets which can support a shelf or tray.

The tray may be solid and placed in a single position or it may move along the horizontal arm of the bracket so it can be spaced away from or towards the vertical standards. Or the shelf may have a telescoping construction so that the back portion remains stationary while the front portion can be adjusted back to front. Or the shelf may have a east-to-west telescoping portion so that while the rear-to front dimension remains the same, the width dimension can change.

Furthermore, by taking advantage of the shelving standard elongated slots, the shelves may be stacked in multiples, while compensating for the pitch of the gondola vertical upright slots.

For a more complete understanding of the above and other features and advantages of the invention, reference should be made to the following detailed description of a preferred embodiment of the invention and to the accompanying drawings.

BRIEF DESCRIPTION OF THE DRAWINGS

Other objects and advantages of the present invention will become apparent when taken in relation with the accompanying drawings in which:

FIGS. 4, 4A are views similar to FIG. 2, showing the lower portion of the vertical shelving standard and the hanging bar in the lower support slot.

FIG. 4A is an enlarged view of a portion of the vertical shelving standard showing a pair of male plugs mounted in a slot;

FIG. 5 is a front perspective view partly in section showing the hanging bars resting on the upper lower surface of the upper elongated slot in the vertical shelving standard and the lower hanging bar being positioned within the lower elongated slot but not touching either the upper or the lower wall;

FIG. 6 is a view similar to FIG. 5 but with the upper surface of the hanging bar resting on the lower wall of the lower elongated slot of the vertical standard and being supported thereby and the upper hanging bar resting within the upper elongated slot of the vertical standard;

FIG. 7 is a cross sectional view showing the vertical force in accordance with the construction shown in FIG. 5;

FIG. 8 is a cross sectional view showing the vertical force in accordance with the construction of FIG. 6.

FIG. 9 is a partially dissembled view of a fixed area shelf, but having means for adjustment of the horizontal arm of the bracket;

DETAILED DESCRIPTION OF THE DRAWING

Figure 1:
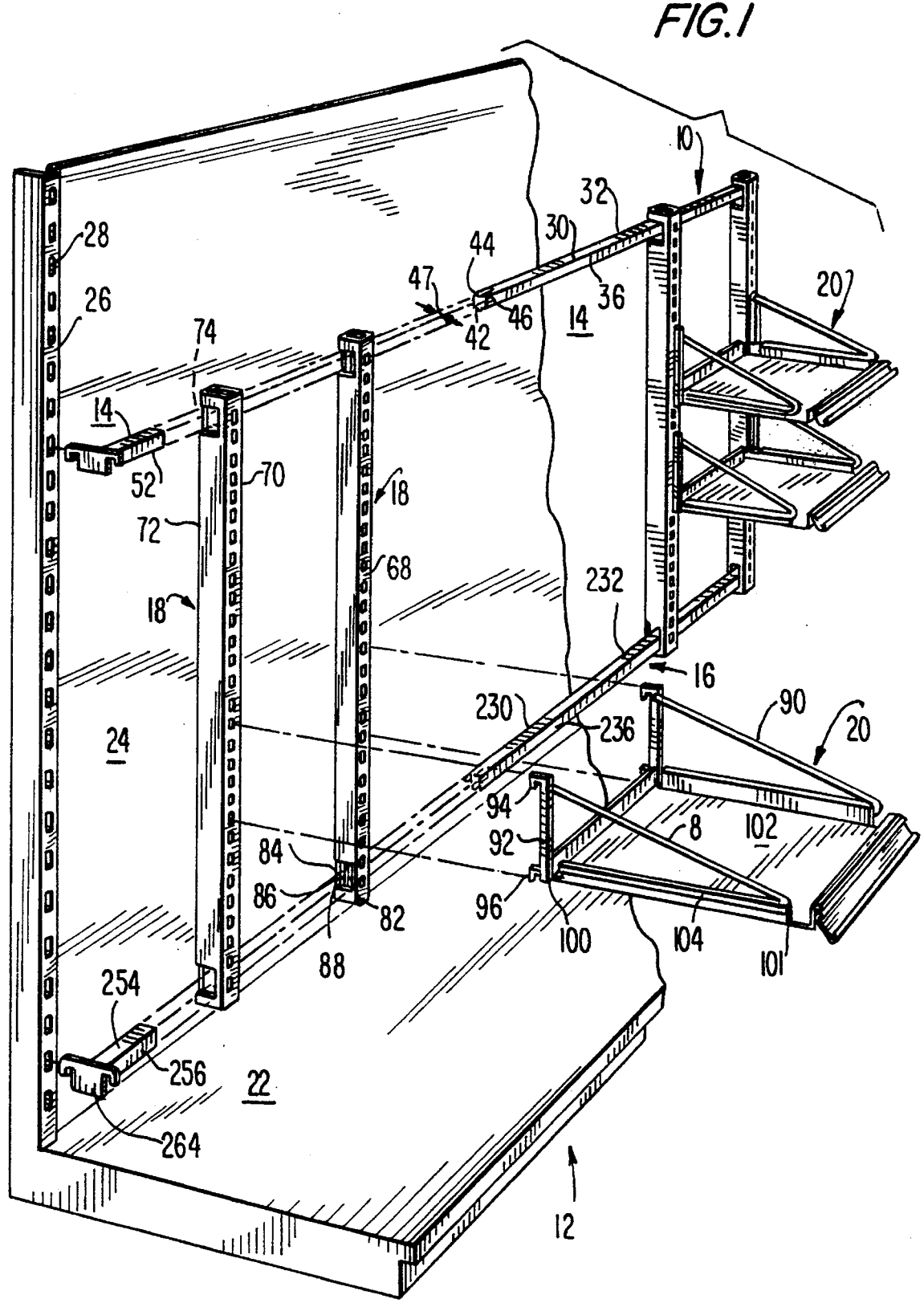
FIG. 1 is a front perspective view of a schematic of a gondola and a partially exploded view of the segmented shelving construction embodying my invention.

Turning to the drawings, and more particularly FIG. 1, there is shown a segmented shelving construction 10 mounted on a gondola 12. The construction is comprised of an upper hanging bar 14, a lower hanging bar 16, vertical standards 18, and shelving assemblies 20.

The gondola 12 is a standard piece of retail equipment which is generally 48" from seam to seam although there are gondolas with 60", 36" or 30" seams. A base 22 stands on a floor and has a vertical wall 24 extending perpendicular to and upwardly from the base. Usually the wall is either at the rear of a one-sided gondola or is essentially in the middle of the base of a two-sided gondola. The outer dimensions of the base, that is, the distance from the wall to the leading edge, generally define the outer dimensions of the merchandising volumes. Along the seam or end of the gondola is a vertical upright 26 with a plurality of vertical slots 28 defined therein. The wall 24 generally is a pegboard with the standard pegboard holes. Under normal usage horizontal shelves are secured via standard hooks in the upright slots 28 and carried in cantilever fashion from the standards 26. Additional arms can be secured to the holes in the peg board to carry lighter loads.

Figure 2:
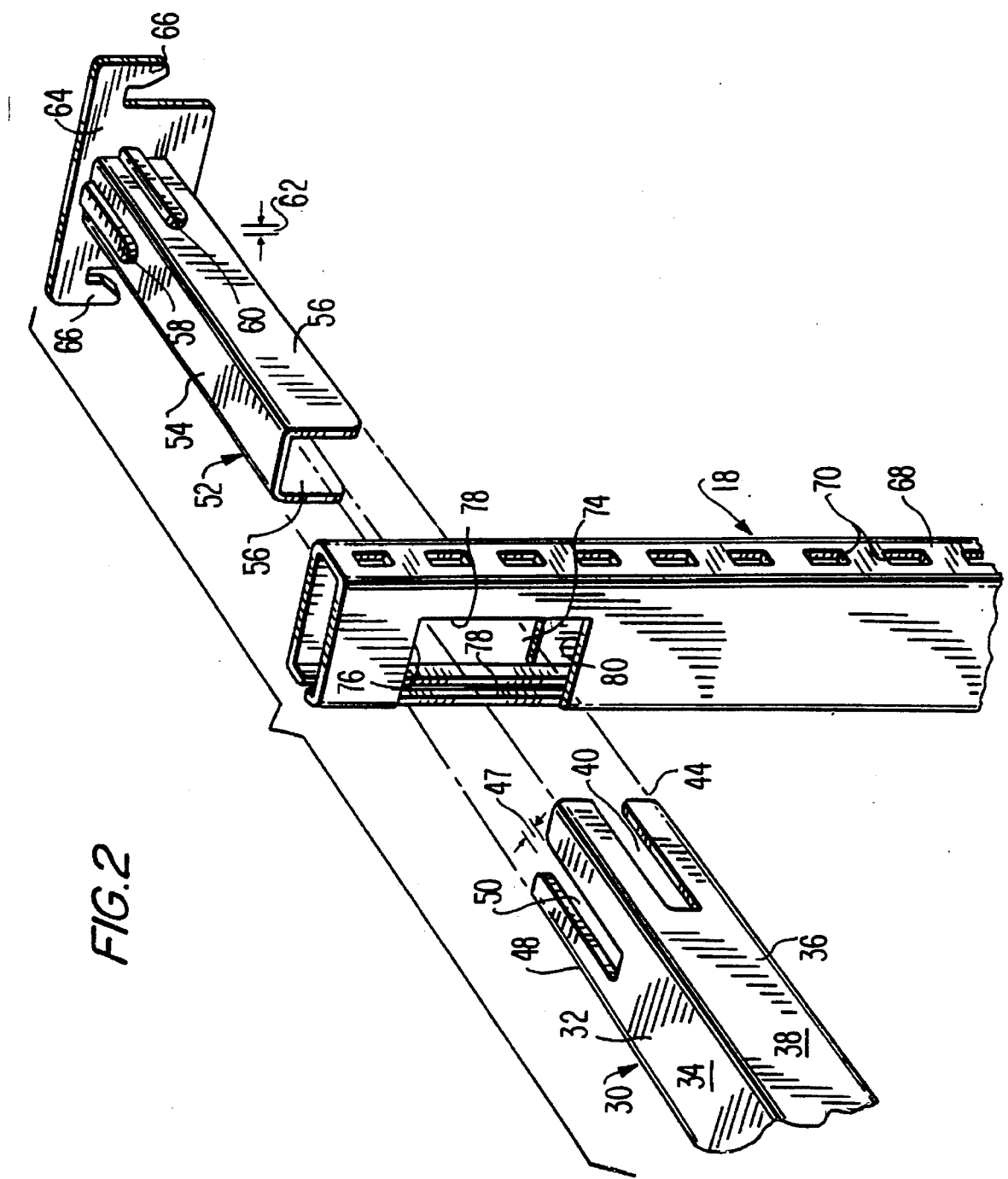
FIG. 2 is a partially exploded enlarged view of FIG. 1 of an upper portion of the vertical shelving standard showing the hanging bar and male end plug about to be joined and then received in the upper support slot.

Turning to the segmented shelving construction 10, the upper hanging bar 14 (FIGS. 1 and 2) comprises an elongated female member 30 defined by a top wall 32 having a top surface 34, side walls 36 and defined by side surfaces 38 and a bottom wall 40 defined by a bottom surface 42. Member 30 terminates at the left or west end 44 and has three inwardly depending channels 46 in each of the walls 32, 36 extending from a point spaced from the end and terminating at the end. The width 47 of the wall will be important for the reason discussed hereafter.

Similarly the east end 48 (FIG. 2) has three open channels 50 and also having the same width 47.

Member 30 receives a male end plug 52 (FIG. 2) having a top wall 54, side walls 56 carrying at its far end top and side elongated beads 58, 60. The beads are of a width 62 which is the same as the width 47. The unit terminates in T-member 64 having oppositely disposed hooks 66. The hooks are designed to be received within the slots 28 in the gondola vertical standard 26. Because the hooks are on both sides of the T-member 64, the member can be introduced interchangeably on either side of the female member 30.

Figure 3A:
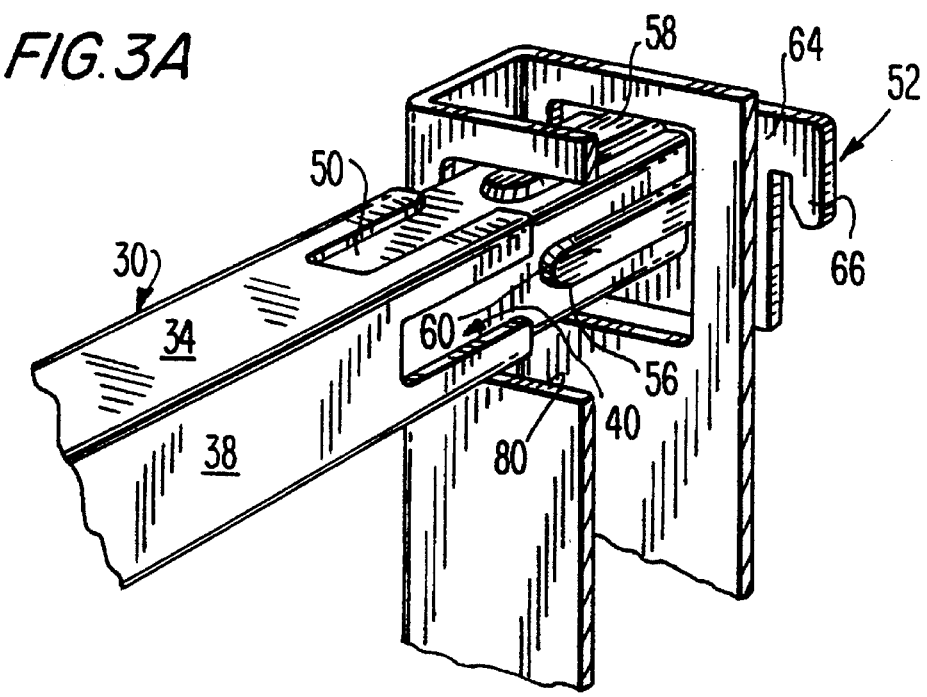
FIGS. 3A and 3B are views similar to FIG. 2 with the male plug partially positioned within the hanging bar and the beads partially received with the channels, illustrating the adjustable length feature of the invention.
Figure 3B:
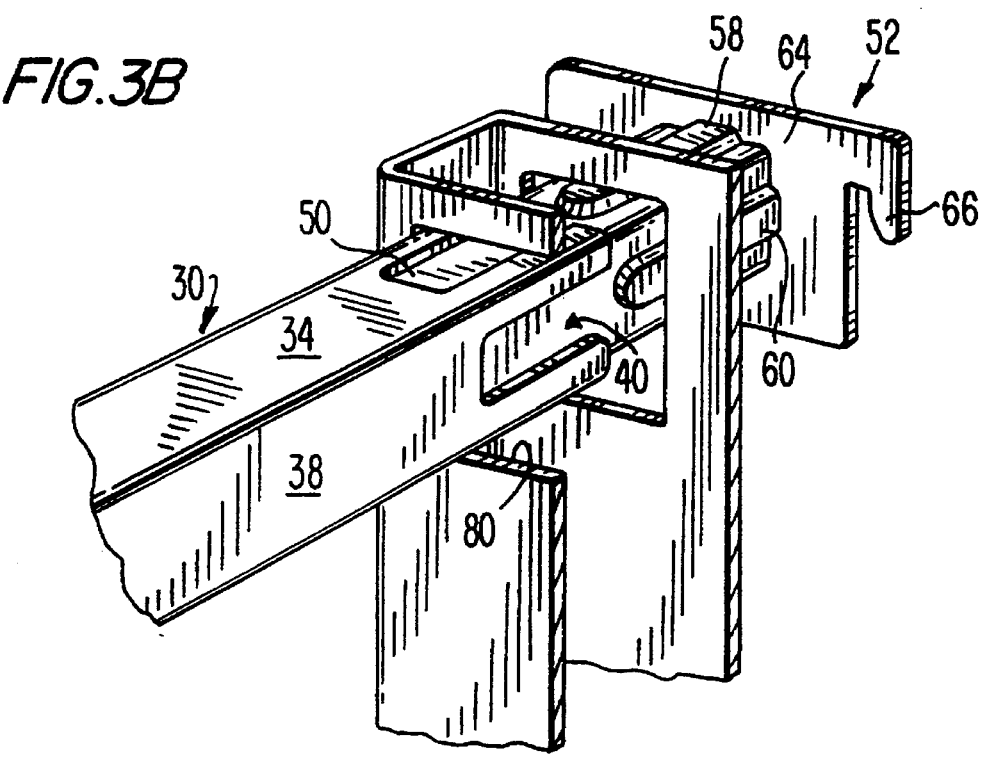

An important feature of the invention is that the length of the handling bar can be adjusted somewhat, because the male plug 52 does not have to be fully received within the female member 30 (FIGS. 3A and 3B). For example, this is possible because if the plug extends somewhat outwardly from its normally fully seated position within the female, and with the beads 58, 60 received through the whole length of the channels 50, but are only partially received therein. This way, a desired length to accommodate a different size shelf can be accommodated. Thus, for example, an extended hanging bar construction carries a vertical standard 18 positioned so that it abuts the extended T-member 64, the standard will be supported on the beads 58 even though it may not rest upon the upper surface 34 of the female member 30. If the beads were not present, the hanging bar would abut the surface 54 of the male plug and be a distance equal the width 47 below the hanging bar. This would of course uneven this with the mounting of the shelving, etc. However, with the presence of the beads in construction in the male plug 52 this will not happen, even when there has to be an adjustment.

Figure 4:
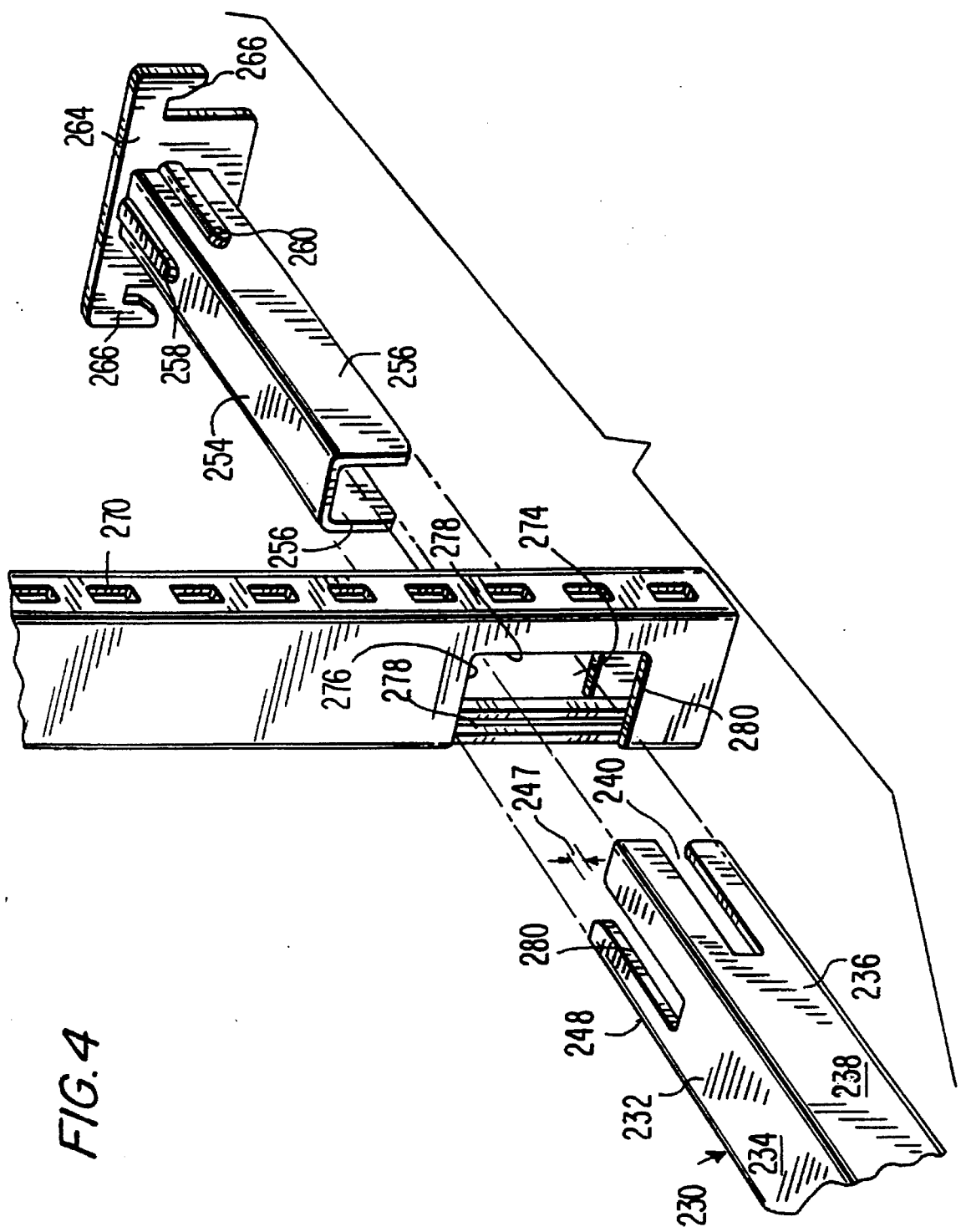

In a similar manner the lower hanging bar and plugs are dimensioned and assembled as depicted in FIG. 4. Like parts on the lower female member and male end plug are designated by the same numbers as the upper members but with the addition of the prefix numeral "2".

The vertical standard 18 is defined by a front wall 68 having a plurality of vertical slots 70, and side walls 72. Proximate the upper end is an elongated upper slot 74 (FIG. 2) defined by an upper inner surface 76, side surfaces 78 and a bottom surface 80.

Proximate the lower end is an elongated lower slot 82 defined by an upper surface 84, side surfaces 86 and a bottom surface 88. The elongated lower slot 82 is approximately the same vertical height as the slot 70 for the purpose hereinafter appearing.

The shelving assembly 20 (FIG. 1) can assume various embodiments. The first (but not necessarily the preferred) is shown in FIG. 1.

More specifically, the shelving assembly includes triangular brackets 90 having a standard vertical hooking support 92 with upper and lower hooks 94, 96. Depending downwardly from the upper hook is the hypotenuse leg 98 and depending from the lower hook is the horizontal leg 100, both meeting at the apex 101. As seen in FIG. 1, the tray 102 is a series of side leg channels 104 which receive the horizontal leg 100. When it is assembled, as shown, and the hooks are secured to the slots 70 of the vertical standard 18, the shelf may be positioned in any desired vertical location along the standard. Because of the fixed dimensions the position of the tray vis-a-vis the hooks on the standards can not be changed.

Figure 11:
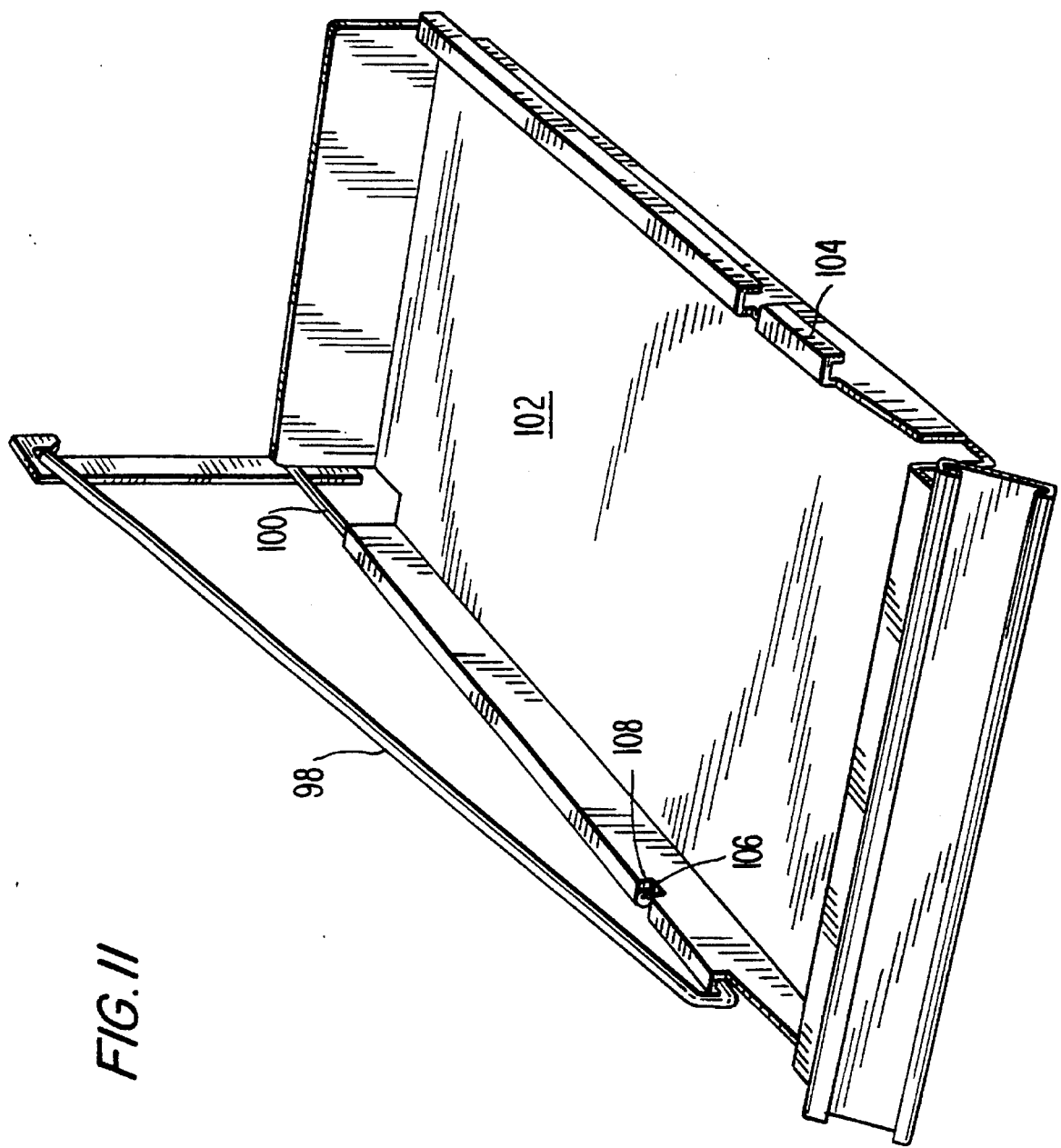
FIG. 11 is a view of a shelf having adjustment along the brackets and a telescoping adjustment along the length of the tray.

In the second embodiment shown in FIGS. 9 and 11 the legs 98 and 100 have been elongated. A bead 106 is attached to the leg 100 can either be positioned forwardly of the channel 104 as shown in FIG. 9 or be placed in the notch 108 (FIG. 11). Depending upon the bead placement, the tray can be placed abutting the gondola's back wall 24 (FIG. 11) or spaced away from the wall (FIG. 11).

Figure 10:
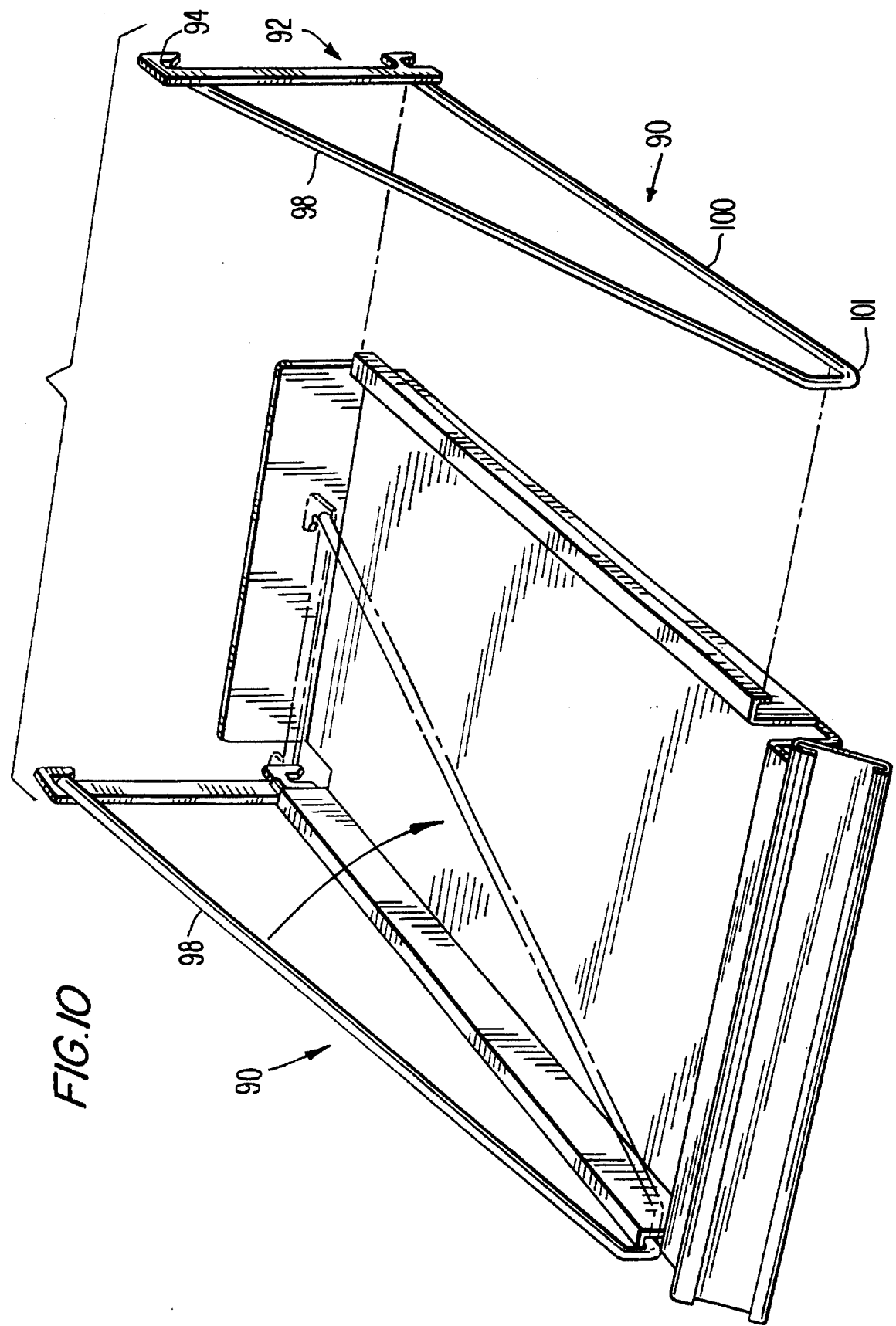
FIG. 10 is a view similar to FIG. 9 showing a fixed area shelf being non-adjustable along the horizontal arm and showing how the bracket folds for storage and shipment and how the bracket is received within the channel of the tray.

FIG. 10 shows that the triangular brackets of the first embodiment can be folded underneath and against the under surface of the shelf base for easy storage and shipment.

Figure 12:
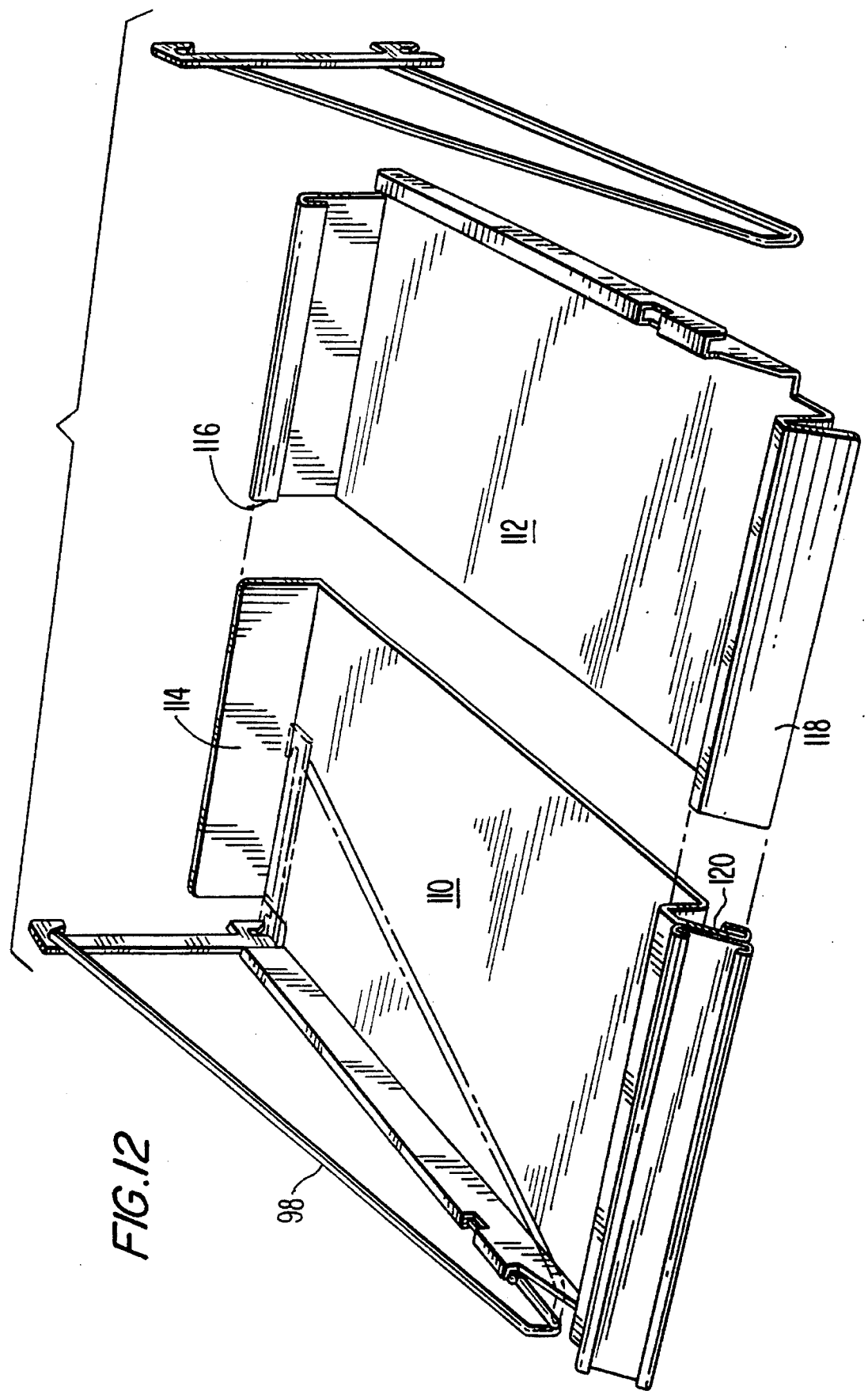
FIG. 12 is a view of a tray showing a telescoping adjustment along the width.

In the embodiment shown in FIG. 12, a tray that has similar features as that of the embodiment of FIGS. 9 and 11, also has the added ability to expand along its width. This is because the tray is composed two sections, the normal section 110 and a telescoping section 112, which is designed to engage with the upward rear wall 114 via an enveloping lip 116 on the wall 112. Similarly, there is a forward bracket 118 which engages a channel slot 120. Movement in and out allows the tray area to be varied.

As shown in FIG. 4A, abutting hooks 266 from two end plugs can be received within a single slot 28 in upright 26, providing an ability to mount continuous shelving without limitation by the upright. This dramatically improves the efficiency of the shelving construction.

In order to practice the invention, the use of the shelving construction makes an assembly of custom designed shelves with respect to the gondolas available. The appropriate number of hanging bars and vertical standards are selected. The female members 30 are placed in position in the elongated slots both at 274 and the male end plugs are assembled accordingly, with the hooks 64 being placed in position in the slots 28 of the gondola uprights 26. The vertical standards are then moved horizontally along the hanging bars to the desired positions and the hooks 94, 96 of the shelf brackets are placed within position of the slots 70 of the standards 18. Once the assembly is completed, the desired shelves of desired width with the desired volume to accommodate the appropriate SKU is completed.

The essence of the invention is the elongated slots 74, 274. Because they are elongated, it does not matter whether or not the pitch or distance or the sides of the vertical upright slots 28 are the same or different from the pitch and position on the sides 70. For example, if the horizontal hanging bar 14 supports the vertical forces, its upper surface 30 will rest against the lower surface 76 of the elongated slot. This is best illustrated by FIGS. 5 and 7. As can be seen, the cantilever force is supported against the upper surface of the upper elongated slot. The lower hanging bar simply acts to steady the vertical standards and to prevent it from rotating away from the gondola wall.

Similarly, the hanging bar can be supported by the lower horizontal slot 274 against the surface 276. This is illustrated in FIG. 6 and the transmission of the vertical forces are shown in FIG. 8 with the forces being transmitted through the lower hanging bar in the vertical support. The upper hanging bar simply acts to prevent rotational movement of the vertical standard away from the gondola wall. The vertical slots clearly allow for differences and dimensions between gondolas and gondola uprights and allows accommodation for sloppy tolerances in heights and dimensions in the uprights.

Furthermore, if the gondola uprights are high enough, another set of bars and vertical standards may be assembled, once again taking advantage of the presence of the elongated slots, it does not make any difference whether or not the slots in the uprights are of the same pitch as the standards and whether they are not properly machined as to be even and accurate. The slots provide all the adjustment that is necessary and allows the system to work easily and simply.

Then the vertical brackets may be assembled with the hooks 94, 96 being placed within the slots 70. The trays can be vertical as shown in FIG. 1 and they can be of a fixed area. However, it is also possible (see FIGS. 9 and 11 for the tray which may be of a fixed area to be positioned outwardly and forwardly of the gondola wall by simply slipping the head 106 from its normal slot 108 in front of the channel 104 as illustrated. The normal position is illustrated in FIG. 9. The normal tray is illustrated in FIG. 10 and also it can be shown that the vertical brackets can be folded downwardly against the inner surface for ease of packing and shipments.

As previously described, depending on the desire of the user, the various different tray embodiments may be used and the positioning of the tray, depending upon the embodiment may be against the gondola wall or may be spaced therefrom, or the tray area itself may be varied if the embodiment of FIG. 12 is used.

While not shown, a tray can be presented which has no vertical lips then a complete horizontal surface is available that can span several gondolas. Since the vertical standards can be joined with two male plugs being received within one slot 28 (as shown in FIG. 4) support for the shelves can continue and span across the gondolas.

In summary, there is shown a significant advance in gondola shelving construction that allows much greater usage of the volumetric sprays within the gondola and dramatically increasing the availability of space for positioning the more profitable SKU product.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. An improved, segmented shelf construction to increase the efficiency of a gondola merchandising system having a base and vertical uprights secured to the base, the uprights containing a plurality of vertical slots, which comprises (a) a horizontally adjustable hanging bar, said bar having means to allow for adjustment in the horizontal direction, the bar having further means to engage the vertical uprights;

(b) a pair of vertical shelving standards, each of said standards having at least one slot dimensioned to receive the hanging bar whereby the vertical shelving standards are supported by the hanging bar, and a plurality of vertically aligned slots; and (c) shelving assembly means designed to carry merchandise, said shelving means having support bracket means to be received within said vertically aligned slots of said vertical standards, to secure said shelving to said vertical standard.

2. The invention according to claim 1, said horizonal bar adjustment means including at least one male plug having an end hook member and a horizonal male member adapted to be received by an open end of said horizontally adjustable bar, said hook member being dimensioned and adapted to be received within one of said slots of the vertical upright.

3. The invention according to claim 2, said male member further having raised beads extending from said end hook member; said horizontal bar having channels dimensioned to receive said beads.

4. The shelf construction of claim 1 further comprising a lower horizontally adjustable hanging bar, said bar having means to allow for adjustment in the horizontal direction, the bar having further means to engage the vertical uprights; said vertical shelving standards each having a slot dimensioned to receive said lower hanging bar, whereby the vertical shelving standards are further supported by said lower hanging bar.

5. The invention according to claim 4 said horizontal bar adjustment means including at least one male plug having an end hook member and a horizontal male member adapted to be received by an open end of said horizontally adjustable bar, said hook member being dimensioned and adapted to be received within one of said slots of the vertical upright.

6. The invention according to claim 5, said male member further having raised beads extending from said end hook member; said horizontal bar having channels dimensioned to receive said beads.

* * * * *